Patented June 18, 1935

2,005,414

UNITED STATES PATENT OFFICE 2,005,414

CELLULOSE DERIVATIVE COMPOSITION

Harry B. Dykstra, Wilmington, Del., assignor to E. I. du Pont de Nemours & Company, Wilmington, Del., a corporation of Delaware No Drawing. Application March 11, 1932, Serial No. 598,311

8 Claims. (Cl. 106—37)

This invention relates to new compositions of matter and more particularly to polycarboxylic acid esters of unsaturated alcohols, and still more particularly to the preparation of polycarboxylic acid esters of unsaturated alcohols and their use in plastic and coating compositions.

This invention has as an object the preparation of polycarboxylic acid esters of unsaturated alcohols. Another object is the preparation of compositions containing polycarboxylic acid esters of unsaturated alcohols.

These objects are accomplished by a process which consists in reacting polycarboxylic acids or their esters with unsaturated alcohols under suitable conditions, isolating the resulting products, and formulating them into plastic and coating compositions.

I have found that simple or mixed esters of unsaturated alcohols with polycarboxylic acids can be prepared by reacting the polycarboxylic acid or its anhydride with the unsaturated alcohols or mixtures containing the same or their simple esters, by reacting sodium salts or other salts of the polycarboxylic acids with the chlorides or simple esters of the unsaturated alcohols, or mixtures of chlorides or simple esters, or by reacting an ester of the polycarboxylic acids with unsaturated alcohols or mixtures thereof in the presence of a suitable catalyst.

The following examples are illustrative of the methods that may be used for carrying out my invention.

Example I

A mixture of 90 grams crotyl chloride, 110 grams disodium phthalate, and 3 grams dibutylamine as a catalyst was heated to boiling under a reflux condenser for 10 hours. The liquid portion was then distilled in vacuo, 26 grams of a product distilling between 230° and 235° C. at approximately 40 mm. pressure being obtained. This represents a 19% yield of dicrotyl phthalate.

Example II

A mixture containing 2220 grams of mixed crotyl butyl alcohol (boiling range 112°–122° C.), 888 grams phthalic anhydride and 5 grams sulfuric acid was heated to boiling for six hours under a fractionating column connected to a receiver designed to separate the water and return the other constituents to the reaction vessel. More than the theoretical amount of water was removed during this period. The reaction mixture was washed with dilute alkali to remove the acid and was then distilled. The fraction boiling between 215° and 220° C. at approximately 25 mm. pressure amounted to 1175 grams. This fraction had an iodine number of 50.7 and therefore contained approximately 2.7 butyl groups per crotyl group probably as a mixture of crotyl butyl phthalate with dibutyl phthalate and a small amount of dicrotyl phthalate.

Example III

A mixture containing 250 grams of a mixture of oleyl and stearyl alcohol which had an acetyl value of 170 and an iodine number of 53.1, and 65 grams of phthalic anhydride was heated at 170°–210° C. until the acid number dropped to 1.3 (15 hours). The product was heated to 220° C. at 16 mm. pressure to remove all volatile matter. The resulting oleyl stearyl phthalate had an ester number of 171.1. From the iodine number of the original alcohols this product contains, 56% oleyl ester and the remainder stearyl ester probably as a mixture of oleyl stearyl phthalate with smaller amounts of oleyl and stearyl phthalates.

Example IV

Two tenths gram sodium was dissolved in 67 grams cinnamyl alcohol (½ mole) and added to 101 grams diethyl adipate (½ mole). The mixture was heated slowly until the temperature rose to 250° C., during which time 23 grams of ethanol distilled out. The product was washed to remove the sodium compounds and the cinnamyl ethyl adipate thus obtained was dried by heating to 180° C. at 100 mm. pressure.

Example V

Two tenths gram sodium was dissolved in 67 grams cinnamyl alcohol (½ mole) and added to 131 grams methoxy-ethyl adipate (½ mole). The mixture was heated as in Example IV, during which time 38 grams of methoxyethanol distilled out. The mixture containing cinnamyl methoxy-ethyl adipate was washed and dried as in Example IV.

The above examples disclose esters of phthalic and adipic acids but other polybasic acids, for example fumaric, maleic, succinic, malic, itaconic, glutaric, tricarballylic, aconitic, azelaic, pimelic, trimesic, sebacic, suberic, naphthalenetetracarboxylic, quinolinic, benzophenonedicarboxylic, pyromellitic, stilbenedicarboxylic, diphenic, naphthalic, cinchomeronic, citric, hexahydrophthalic, etc., may be used. Suitable unsaturated alcohols are allyl, butadienyl, linalyl, geranyl, erucyl, undecylenyl in addition to those disclosed in the examples above.

The methods for the preparation of the esters described above are capable of considerable variation. The constituents of the reaction mixture may be varied, catalysts other than those mentioned may be used, or solvents may be used without the use of any catalyst. All unsaturated alcohols which have been tested have been found to be suitable for use in this process.

Mixed esters containing, in addition to the unsaturated alcohol radicals, other alcohol radicals such as the radicals of methyl, ethyl, propyl, butyl, hexyl, cyclohexyl, methylcyclohexyl, fenchyl, bormyl, benzyl, phenoxyethyl, tolyloxyethyl, benzyloxyethyl, ethoxyethyl, naphthoxypropyl, butoxyethyl, ethoxypropyl, methoxypropyl, ethoxyethoxyethyl, diethoxypropyl, dibenzyloxypropyl, and diacetone alcohols, etc., triethylether of pentaerythrite, alkyl lactates, alkyl ricinoleates, etc. may also be prepared according to the disclosures of this specification, for example by reacting the alcohol with the acid or acid anhydride in the presence of a catalyst such as hydrochloric or, preferably, sulfuric acid, or by ester interchange with a polycarboxylic acid ester of a volatile alcohol followed by esterification or ester interchange with the unsaturated alcohol.

The polycarboxylic acid esters of unsaturated alcohols mentioned herein refer to esters in which at least one of the alcohol groups is unsaturated, part or all of the remaining acid radicals of the acid being either unesterified or esterified with saturated or unsaturated alcohols.

The esters prepared as above described vary from water white to pale amber liquids to white crystalline solids. They are insoluble in water, but are readily soluble in alcohol, acetone, ethyl acetate, butyl acetate, benzene, xylene, etc. They are compatible when mixed in equal proportions with pyroxylin and are compatible in lower ratios with other cellulose esters and ethers. My new esters are therefore valuable in the manufacture of coating and plastic compositions containing cellulose derivatives. Films containing mixtures of these derivatives, particularly those from mixtures of saturated and unsaturated alcohols, with cellulose derivatives are tough and flexible. Tests have indicated that some of these plasticizers are superior to dibutyl phthalate as regards the adhesion, flexibility, and water resistance of cellulose nitrate lacquers containing them. These plasticizers are high boiling and therefore impart substantially permanent flexibility to films in which they are used.

Typical coating compositions containing these new compounds as plasticizers are given in the following examples:

*Example VI*

| | Parts |
|---|---|
| Cellulose nitrate | 12.0 |
| Pigment | 16.3 |
| Dammar | 3.5 |
| Castor oil | 2.6 |
| Crotyl butyl phthalate | 4.0 |
| Solvent | 161.6 |

This, as well as similar compositions, shows adhesion, flexibility, and water resistance superior to compositions containing dibutyl phthalate as the plasticizer.

*Example VII*

| | Parts |
|---|---|
| Cellulose nitrate | 12.0 |
| Dammar | 3.0 |
| Oleyl stearyl phthalate | 6.6 |
| Solvent | 166.5 |

*Example VIII*

| | Parts |
|---|---|
| Cellulose acetate | 12.0 |
| Cinnamyl methoxyethyl adipate | 6.0 |
| Solvent | 182.0 |

*Example IX*

| | Parts |
|---|---|
| Ethyl cellulose | 4.0 |
| Dicrotyl phthalate | 1.0 |
| Solvent | 24.0 |

In the above examples the term "solvent" is to be understood as designating a suitable mixture of esters, alcohols, and hydrocarbons, such as would be obvious to one skilled in the art of manufacturing coating compositions. These lacquers and enamels give tough flexible films which have good water resistance.

The following examples are illustrative of plastic compositions containing my new plasticizers:

*Example X*

| | Parts |
|---|---|
| Nitrocellulose | 100 |
| Crotyl butyl phthalate | 35 |

*Example XI*

| | Parts |
|---|---|
| Cellulose acetate | 100 |
| Cinnamyl adipate | 40 |

*Example XII*

| | Parts |
|---|---|
| Ethyl cellulose | 100 |
| Cinnamyl methoxyethyl adipate | 20 |

*Example XIII*

| | Parts |
|---|---|
| Nitrocellulose | 100 |
| Dicrotyl phthalate | 50 |
| Filler | 200 |

The above compositions may be prepared with or without the usual volatile solvents or diluents, that is, alcohol for the cellulose nitrate compositions; acetone for the cellulose acetate compositions; toluol-alcohol mixtures for the ether compositions, etc. It is to be understood that any part of the plasticizer in the above examples may be replaced by other plasticizers of the group covered by this invention or by one or more of the more common plasticizers such as triacetine, triphenyl phosphate, dibutyl phthalate, camphor, tricresyl phosphate, etc. Other resins besides dammar, such as ester gum and certain synthetic resins (for example polyhydric alcohol-polybasic acid resins) may be used in the above examples. Cellulose derivatives other than those mentioned, such as benzyl, crotyl, and other ethers of cellulose, as well as esters like cellulose propionate, aceto-butyrate, aceto-nitrate crotonate, stearate, phthalate, etc., may be used in the compositions set forth in the examples. The esters of this invention are particularly valuable as plasticizers, solvents, etc., for cellulose ethers and cellulose nitrate.

In addition to their use in coating and plastic compositions, the esters disclosed herein are valuable for the preparation of all types of compositions containing cellulose esters or ethers. In particular, they may be used in the preparation of lacquers for coating metal and wood; in dopes for coating fabrics, paper, etc., and in plastic compositions to be used in the preparation of toiletware, novelties, sheeting, rods, tubes, safety glass, etc. They may also be used in cellulose derivative adhesive compositions. Nitrocellulose plasticized with these esters may also be used in connection with nitroglycerin in the preparation of blasting explosives.

By means of the present invention plasticizers for cellulose derivatives are produced which impart superior adhesion, flexibility, and water resistance to the compositions in which they are used. Due to their low vapor pressure, products containing them are permanently flexible and have good durability.

As many apparently widely different embodiments of this invention may be made without departing from the spirit and scope thereof, it is to be understood that I do not limit myself to the specific embodiments thereof except as defined in the following claims.

I claim:

1. A composition comprising a cellulose derivative and an ester of a polycarboxylic acid of at least 5 carbon atoms wherein the hydrogen atom of at least one carboxyl group is replaced by a radical from the group consisting of crotyl, oleyl, cinnamyl, allyl, butadienyl, linalyl, geranyl, erucyl, and undecylenyl.

2. A composition comprising a cellulose derivative and an ester of an aromatic dicarboxyl acid of at least 5 carbon atoms wherein the hydrogen atom of at least one carboxyl group is replaced by a radical from the group consisting of crotyl, oleyl, cinnamyl, allyl, butadienyl, linalyl, geranyl, erucyl, and undecylenyl.

3. A composition comprising a cellulose derivative and an ester of an aliphatic dicarboxylic acid of at least 5 carbon atoms wherein the hydrogen atoms of at least one carboxyl group is replaced by a radical from the group consisting of crotyl, oleyl, cinnamyl, allyl, butadienyl, linalyl, geranyl, erucyl, and undecylenyl.

4. A composition comprising a cellulose derivative and an ester of phthalic acid wherein the hydrogen atom of at least one carboxyl group is replaced by a radical from the group consisting of crotyl, oleyl, cinnamyl, allyl, butadienyl, linalyl, geranyl, erucyl, and undecylenyl.

5. A composition comprising a cellulose derivative and an ester of adipic acid wherein the hydrogen atom of at least one carboxyl group is replaced by a radical from the group consisting of crotyl, oleyl, cinnamyl, allyl, butadienyl, linalyl, geranyl, erucyl, and undecylenyl.

6. A composition comprising a cellulose derivative and cinnamyl methoxyethyl adipate.

7. A composition comprising a cellulose derivative and crotyl butyl phthalate.

8. A composition comprising a cellulose derivative and oleyl stearyl phthalate.

HARRY B. DYKSTRA.